US006765968B1

(12) United States Patent
Nelson et al.

(10) Patent No.: US 6,765,968 B1
(45) Date of Patent: Jul. 20, 2004

(54) PROCESS TRANSMITTER WITH LOCAL DATABUS

(75) Inventors: Richard L. Nelson, Chanhassen, MN (US); Weston R. Roper, St. Louis Park, MN (US); Brian L. Westfield, Victoria, MN (US)

(73) Assignee: Rosemount Inc., Eden Prairie, NM (US)

( * ) Notice: Subject to any disclaimer, the term of this patent is extended or adjusted under 35 U.S.C. 154(b) by 787 days.

(21) Appl. No.: 09/672,338

(22) Filed: Sep. 28, 2000

Related U.S. Application Data

(60) Provisional application No. 60/156,369, filed on Sep. 28, 1999.

(51) Int. Cl.$^7$ ................................................. H04B 3/00
(52) U.S. Cl. ...................................................... 375/257
(58) Field of Search ................................. 375/224, 257, 375/258, 295, 222; 73/865.9, 866, 863.31

(56) References Cited

U.S. PATENT DOCUMENTS

| | | | |
|---|---|---|---|
| 3,701,280 A | 10/1972 | Stroman | 73/194 |
| 3,742,450 A | * 6/1973 | Weller | 375/257 |
| 3,968,694 A | 7/1976 | Clark | 9/12 |
| 4,120,206 A | 10/1978 | Rud, Jr. | 73/718 |
| 4,124,027 A | 11/1978 | Boss | 73/724 |
| 4,238,825 A | 12/1980 | Geery | 364/510 |
| 4,250,490 A | 2/1981 | Dahlke | 340/870.37 |
| 4,287,501 A | 9/1981 | Tominaga et al. | 338/42 |
| 4,414,634 A | 11/1983 | Louis et al. | 364/510 |
| 4,419,898 A | 12/1983 | Zanker et al. | 73/861.02 |
| 4,446,730 A | 5/1984 | Smith | 73/301 |
| 4,455,875 A | 6/1984 | Guimard et al. | 73/708 |
| 4,485,673 A | 12/1984 | Stern | 73/304 |
| 4,528,855 A | 7/1985 | Singh | 73/721 |
| 4,562,744 A | 1/1986 | Hall et al. | 73/861.02 |
| 4,598,381 A | 7/1986 | Cucci | 364/558 |
| 4,602,344 A | 7/1986 | Ferretti et al. | 364/509 |
| 4,617,607 A | 10/1986 | Park et al. | 361/283 |
| D287,827 S | 1/1987 | Broden | D10/46 |
| 4,644,797 A | 2/1987 | Ichikawa et al. | 73/706 |
| 4,653,330 A | 3/1987 | Hedtke | 73/756 |
| 4,677,841 A | 7/1987 | Kennedy | 73/30 |

(List continued on next page.)

FOREIGN PATENT DOCUMENTS

| | | |
|---|---|---|
| DE | 34 41 648 A1 | 12/1987 |
| DE | G 91 09 176.4 | 10/1991 |
| DE | 197 45 244 A1 | 5/1998 |
| DE | 299 03 260 u1 | 5/2000 |
| EP | 0 063 685 A1 | 11/1982 |

(List continued on next page.)

OTHER PUBLICATIONS

Product Data Sheet No: 00813–0100–4378, "Model 751 Field Signal Indicator", by Rosemount Inc., Eden Prairie, Minnesota, (1997).
Product Data Sheet No: 00813–0100–4731, "APEX™ Radar Gauge", by Rosemount Inc., Eden Prairie, Minnesota, (1998).

(List continued on next page.)

Primary Examiner—Don N. Vo
(74) Attorney, Agent, or Firm—Westman, Champlin & Kelly

(57) ABSTRACT

An industrial process control system includes a remote transmitter that measures a process variable to transmit data over a process control loop. A local databus interface includes an active current source and is configured to transmit and/or receive data on a local databus. The local databus includes a signaling wire operated to a high signal level during idle communications and modulated between the high and a low signal level during data communication. The active current source is coupled to the signaling wire of the databus to limit current drawn by the signaling wire during a low signal level.

17 Claims, 3 Drawing Sheets

U.S. PATENT DOCUMENTS

| | | | | |
|---|---|---|---|---|
| 4,701,938 A | * | 10/1987 | Bell | 375/257 |
| 4,745,810 A | | 5/1988 | Pierce et al. | 73/706 |
| D296,995 S | | 8/1988 | Lee | D10/46 |
| D297,314 S | | 8/1988 | Hedtke | D10/46 |
| D297,315 S | | 8/1988 | Pierce et al. | D10/85 |
| 4,783,659 A | | 11/1988 | Frick | 340/870.37 |
| 4,791,352 A | | 12/1988 | Frick et al. | 324/60 |
| 4,798,089 A | | 1/1989 | Frick et al. | 73/706 |
| 4,818,994 A | | 4/1989 | Orth et al. | 340/870.21 |
| 4,825,704 A | | 5/1989 | Aoshima et al. | 73/861.42 |
| 4,833,922 A | | 5/1989 | Frick et al. | 73/756 |
| 4,850,227 A | | 7/1989 | Luettgen et al. | 73/708 |
| 4,866,989 A | | 9/1989 | Lawless | 73/756 |
| 4,881,412 A | | 11/1989 | Northedge | 73/861.04 |
| 4,930,353 A | | 6/1990 | Kato et al. | 73/727 |
| 4,958,938 A | | 9/1990 | Schwartz et al. | 374/208 |
| 4,970,898 A | | 11/1990 | Walish et al. | 73/706 |
| 4,980,675 A | | 12/1990 | Meisenheimer, Jr. | 340/626 |
| 5,000,047 A | | 3/1991 | Kato et al. | 73/706 |
| D317,266 S | | 6/1991 | Broden et al. | D10/46 |
| D317,269 S | | 6/1991 | Selg | D10/52 |
| D318,432 S | | 7/1991 | Broden et al. | D10/46 |
| 5,028,746 A | | 7/1991 | Petrich | 191/12.2 R |
| 5,035,140 A | | 7/1991 | Daniels et al. | 73/290 |
| 5,051,937 A | | 9/1991 | Kawate et al. | 364/571.01 |
| 5,058,437 A | | 10/1991 | Chaumont et al. | 73/861.21 |
| 5,060,108 A | | 10/1991 | Baker et al. | 361/283 |
| 5,070,732 A | | 12/1991 | Duncan et al. | 73/431 |
| 5,083,091 A | | 1/1992 | Frick et al. | 324/678 |
| 5,087,871 A | | 2/1992 | Losel | 323/299 |
| 5,094,109 A | | 3/1992 | Dean et al. | 73/718 |
| D329,619 S | | 9/1992 | Cartwright | D10/52 |
| 5,142,914 A | | 9/1992 | Kusakabe et al. | 73/723 |
| 5,157,972 A | | 10/1992 | Broden et al. | 73/718 |
| 5,162,725 A | | 11/1992 | Hodson et al. | 324/115 |
| 5,187,474 A | | 2/1993 | Kielb et al. | 340/870.18 |
| 5,227,782 A | | 7/1993 | Nelson | 340/870.11 |
| 5,236,202 A | | 8/1993 | Krouth et al. | 277/164 |
| 5,245,333 A | | 9/1993 | Anderson et al. | 340/870.3 |
| 5,248,167 A | | 9/1993 | Petrich et al. | 285/23 |
| D342,456 S | | 12/1993 | Miller et al. | D10/60 |
| 5,276,631 A | | 1/1994 | Popovic et al. | 364/571.04 |
| 5,287,746 A | | 2/1994 | Broden | 73/706 |
| 5,353,200 A | | 10/1994 | Bodin et al. | 361/816 |
| 5,369,386 A | | 11/1994 | Alden et al. | 335/206 |
| 5,377,547 A | | 1/1995 | Kusakabe et al. | 73/723 |
| 5,381,355 A | | 1/1995 | Birangi et al. | 364/724.01 |
| D358,784 S | | 5/1995 | Templin, Jr. et al. | D10/96 |
| 5,436,824 A | | 7/1995 | Royner et al. | 363/89 |
| 5,448,180 A | | 9/1995 | Kienzler et al. | 326/15 |
| 5,469,150 A | | 11/1995 | Sitte | 340/825.07 |
| 5,471,885 A | | 12/1995 | Wagner | 73/862.04 |
| D366,000 S | | 1/1996 | Karas et al. | D10/60 |
| D366,218 S | | 1/1996 | Price et al. | D10/52 |
| 5,495,768 A | | 3/1996 | Louwagie et al. | 73/706 |
| 5,498,079 A | | 3/1996 | Price | 374/208 |
| 5,502,659 A | | 3/1996 | Braster et al. | 364/571.01 |
| 5,524,333 A | | 6/1996 | Hogue et al. | 29/593 |
| 5,524,492 A | | 6/1996 | Frick et al. | 73/706 |
| 5,546,804 A | | 8/1996 | Johnson et al. | 73/431 |
| 5,600,782 A | | 2/1997 | Thomson | 395/182.02 |
| 5,606,513 A | | 2/1997 | Louwagie et al. | 364/510 |
| 5,656,782 A | | 8/1997 | Powell, II et al. | 73/756 |
| 5,665,899 A | | 9/1997 | Willcox | 73/1.63 |
| 5,668,322 A | | 9/1997 | Broden | 73/756 |
| 5,669,713 A | | 9/1997 | Schwartz et al. | 374/1 |
| 5,670,722 A | | 9/1997 | Moser et al. | 73/756 |
| 5,677,476 A | | 10/1997 | McCarthy et al. | 73/29.01 |
| 5,710,552 A | | 1/1998 | McCoy et al. | 340/870.21 |
| 5,754,596 A | | 5/1998 | Bischoff et al. | 375/295 |
| 5,764,928 A | | 6/1998 | Lanctot | 395/285 |
| 5,787,120 A | * | 7/1998 | Louagie et al. | 375/257 |
| 5,823,228 A | | 10/1998 | Chou | 137/597 |
| 5,870,695 A | | 2/1999 | Brown et al. | 702/138 |
| 5,899,962 A | | 5/1999 | Louwagie et al. | 702/138 |
| 5,920,016 A | | 7/1999 | Broden | 73/756 |
| 5,948,988 A | | 9/1999 | Bodin | 73/706 |
| 5,954,526 A | | 9/1999 | Smith | 439/136 |
| 5,955,684 A | | 9/1999 | Gravel et al. | 73/866.5 |
| 5,973,942 A | | 10/1999 | Nelson et al. | 363/21 |
| 5,988,203 A | | 11/1999 | Hutton | 137/597 |
| 6,005,500 A | | 12/1999 | Gaboury et al. | 341/43 |
| 6,006,338 A | | 12/1999 | Longsdorf et al. | 713/340 |
| 6,038,927 A | | 3/2000 | Karas | 73/706 |
| 6,050,145 A | | 4/2000 | Olson et al. | 73/706 |
| 6,059,254 A | | 5/2000 | Sundet et al. | 248/678 |
| 6,105,437 A | | 8/2000 | Klug et al. | 73/756 |
| 6,111,888 A | | 8/2000 | Green et al. | 370/461 |
| 6,115,831 A | | 9/2000 | Hanf et al. | 714/43 |
| 6,123,585 A | | 9/2000 | Hussong et al. | 439/652 |
| 6,131,467 A | | 10/2000 | Miyano et al. | 73/756 |
| 6,140,952 A | | 10/2000 | Gaboury | 341/143 |
| 6,151,557 A | | 11/2000 | Broden et al. | 702/47 |
| 6,216,172 B1 | | 4/2001 | Kölblin et al. | 709/253 |
| 6,233,532 B1 | | 5/2001 | Boudreau et al. | 702/89 |
| 6,285,964 B1 | | 9/2001 | Babel et al. | 702/121 |
| 6,295,875 B1 | | 10/2001 | Frick et al. | 73/718 |
| 6,311,568 B1 | | 11/2001 | Kleven | 73/861.42 |
| 6,321,166 B1 | | 11/2001 | Evans et al. | 702/50 |
| 6,429,786 B1 | * | 8/2002 | Bansemir et al. | 340/870.27 |
| 6,516,672 B2 | | 4/2003 | Wang | 73/718 |
| 6,553,076 B1 | * | 4/2003 | Huang | 375/257 |
| 6,546,805 B2 | | 11/2003 | Fandrey et al. | 73/753 |

FOREIGN PATENT DOCUMENTS

| | | |
|---|---|---|
| EP | 0 167 941 | 6/1985 |
| EP | 0 214 801 A1 | 3/1987 |
| EP | 0 223 300 A2 | 5/1987 |
| EP | 0 268 742 A1 | 7/1987 |
| EP | 0 903 651 A1 | 3/1999 |
| JP | 2000121470 | 10/1998 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 96/34264 | 10/1996 |
| WO | WO 98 48489 | 10/1998 |
| WO | WO 00/23776 | 4/2000 |

OTHER PUBLICATIONS

Product Data Sheet No: 00813–0100–4640, "Model 3201 Hydrostatic Interface Unit", from the Rosemount Comprehensive Product Catalog, published 1998, by Rosemount Inc., Eden Prairie, Minnesota.

Product Data Sheet No: 00813–0100–4003, "Model 8800A", by Rosemount Inc., Eden Prairie, Minnesota, (1998).

Product Data Sheet No: 00813–0100–4773, "Model 8742C—Magnetic Flowmeter Transmitter with Foundation™ Fieldbus", from the Rosemount Comprehensive Product Catalog, published 1998, by Rosemount Inc., Eden Prairie, Minnesota.

"Rosemount Model 8732C Magnetic Flowmeter Transmitter", by Rosemount Inc., Eden Prairie, Minnesota, (1998).

Product Data Sheet No: 00813–0100–4263, "Model 444 Alphaline® Temperature Transmitters", by Rosemount Inc., Eden Prairie, Minnesota, (1997).

Product Data Sheet No: 00813–0100–4769, "Model 3244MV Multivariable Temperature Transmitter with Foundation™ Fieldbus", by Rosemount Inc., Eden Prairie, Minnesota, (1998).

Product Data Sheet No: 00813–0100–4724, "Models 3144 and 3244MV Smart Temperature Transmitters", by Rosemount Inc., Eden Prairie, Minnesota, (1998).

Product Data Sheet No: 00813–0100–4738, "Model 3095FB Multivariable™ Transmitter with Modbus™ Protocol", by Rosemount Inc., Eden Prairie, Minnesota, (1996, 1997).

Product Data Sheet No: 00813–0100–4001, "Model 3051 Digital Pressure Transmitter for Pressure, Flow, and Level Measurement", by Rosemount Inc., Eden Prairie, Minnesota, (1998).

Product Data Sheet No: 00813–0100–4698, "Model 2090F Sanitary Pressure Transmitter", by Rosemount Inc., Eden Prairie, Minnesota, (1998).

Product Data Sheet No: 00813–0100–4690, "Model 2088 Economical Smart Pressure Transmitter", by Rosemount Inc., Eden Prairie, Minnesota, (1998).

Product Data Sheet No: 00813–0100–4592, "Model 2024 Differential Pressure Transmitter", by Rosemount Inc., Eden Prairie, Minnesota, (1987–1995).

Product Data Sheet No: 00813–0100–4360, "Model 1151 Alpaline® Pressure Transmitters", by Rosemount Inc., Eden Prairie, Minnesota, (1998).

Product Data Sheet No: 00813–0100–4458, "Model 1135F Pressure–to–Current Converter", by Rosemount Inc., Eden Prairie, Minnesota, (1983, 1986, 1994).

"Single Chip Senses Pressure and Temperature," *Machine Design*, 64 (1992) May 21, No. 10.

Brochure: "Reduce Unaccounted–For Natural Gas with High–Accuracy Pressure Transmitters," Rosemount Inc. Measurement Division, Eden Prairie, Minnesota, ADS 3073, May 1991, pp. 1–4.

Technical Information Bulletin, "Liquid Level Transmitter Model DB40RL Sanitary Sensor deltapilot," Endress + Hauser, Greenwood, Indiana, Sep. 92, pp. 1–8.

"The Digitisation of Field Instruments" W. Van Der Bijl, *Journal A,* vol. 32, No. 3, 1991, pp. 62–65.

Specification Summary, "Teletrans™ 3508–30A Smart Differential Pressure Transmitter," (undated) Bristol Babcock, Inc., Watertown, CT, 06795.

Specification Summary, "Teletrans™ 3508–10A Smart Pressure Transmitter," (undated) Bristol Babcock, Inc., Watertown, CT, 06795.

Specification Summary, "AccuRate Advanced Gas Flow Computer, Model GFC 3308," (undated) Bristol Babcock, Inc., Watertown, CT, 06795.

Product Data Sheet PDS 4640, "Model 3201 Hydrostatic Interface Unit," Mar. 1992, Rosemount Inc., Eden Prairie, MN 55344.

Product Data Sheet PDS 4638, "Model 3001CL Flush–Mount Hydrostatic Pressure Transmitter," Jul. 1992, Rosemount Inc., Eden Prairie, MN 55344.

"Flow Measurement," *Handbook of Fluid Dynamics,* V. Streeter, Editor–in–chief, published by McGraw–Hill Book Company, Inc. 1961, pp. 14–4 to 14–15.

"Precise Computerized In–Line Compressible Flow Metering," *Flow—Its Measurement and Control in Science and Industry,* vol. 1, Part 2, Edited by R. Wendt, Jr., Published by American Institute of Physics et al, (undated) pp. 539–540.

"A Systems Approach," Dr. C. Ikoku, *Natural Gas Engineering,* PennWell Books, (undated) pp. 256–257.

"Methods for Volume Measurement Using Tank–Gauging Devices Can Be Error Prone," F. Berto, *The Advantages of Hydrostatic Tank Gauging Systems,* undated reprint from *Oil & Gas Journal.*

"Hydrostatic Tank Gauging—Technology Whose Time Has Come," J. Berto, *Rosemount Measurement Division Product Feature,* undated reprint from *INTECH.*

"Pressure Sensors Gauge Tank Level and Fluid Density," *Rosemount Measurement Division Product Feature,* undated reprint from *Prepared Foods* (Copyrighted 1991 by Gorman Publishing Company).

"Low Cost Electronic Flow Measurement System," *Tech Profile,* May 1993, Gas Research Institute, Chicago, IL.

"Development of an Integrated EFM Device for Orifice Meter Custody Transfer Applications," S. D. Nieberle et al., *American Gas Association Distribution/Transmission Conference & Exhibit,* May 19, 1993.

Advertisement, AccuRate Model 3308 Integral Smart DP/P/T Transmitter, (undated) Bristol Babcock, Inc., Watertown, CT 06795.

Advertisement, Model 3508 DP Transmitter, *Control Engineering,* Dec. 1992, Bristol Babcock, Inc., Watertown, CT 06795.

"Smart Transmitters Tear Up The Market," C. Polsonetti, *INTECH,* Jul. 1993, pp. 42–45.

"MicroLAN Design Guide", Dallas Semiconductor, Tech Brief No. 1, (undated).

"Bosch CAN Specification Version 2.0", by Robert Bosch GmbH, pp. 1–68 including pp. –1– and –2–, (Sep. 1991).

Product Data Sheet No. 00813–0100–4001, "Digital Pressure Transmitter for Pressure, Flow, and Level Measurement", by Rosemount Inc., (1998).

"Claudius Ptolemy (100?–170? AD)", *M&News,* 7 pages, (Apr. 1994).

American National Standard , "Hydraulic Fluid Power–Solenoid Piloted Industrial Valves–Interface Dimensions for Electrical Connectors", National Fluid Power Association, Inc., 10 pages, (Aug. 1981).

2 pages downloaded from http://www.interlinkbt.com/product/ibt_prod/dn/cn–dm_pn/euro.dp.htm dated Sep. 15, 2000.

4 pages downloaded from http://www.interlinkbt.com/product/ibt_prod/dn/eur–con/euro–fwc.htm dated Sep. 15, 2000.

3 pages from TURK Cable Standards, by Turk, Inc., Minneapolis, Minnesota.

* cited by examiner

US 6,765,968 B1

PROCESS TRANSMITTER WITH LOCAL DATABUS

CROSS-REFERENCE TO RELATED APPLICATION

This application claims priority of Provisional Application No. 60/156,369 filed Sep. 28, 1999 for "Unitized Modularity in a Process Transmitter".

BACKGROUND OF THE INVENTION

The present invention relates to process transmitters of the type used to measure a variable of a process. More specifically, the invention relates to a local databus for a process transmitter.

Remote industrial process control transmitters are used to monitor and/or control industrial processes in remote locations. These transmitters are often coupled by two-wire process control communication loops to central control stations that might also supply power to the remote transmitters. Thus, a 4–20 mA two-wire process control loop couples the remote transmitter to a central control station to exchange of data between the central control station and the remote transmitter and to power the transmitter. The remote transmitter usually includes a sensor that monitors a process variable, such that the transmitter transmits data to the central station indicative of that variable. Alternatively, the transmitter might include a control device, such as a valve, to control the industrial process on command from the central station. Because these remote transmitters often operate in hazardous environments, they are designed to draw no more than about 18 milliwatts (mW), usually drawing about 3 milliamperes (mA) at 6 volts.

In some environments, it is advantageous to couple one or more peripheral devices to a remote transmitter via a local databus. For example, advantages may result in coupling an independent display indicator, remote sensor, remote data processor or even another remote transmitter to an industrial process control transmitter. However, power constraints often makes it impractical to couple peripheral devices to remote transmitters that are coupled to a two-wire process control loop. More particularly, known local databuses consume so much power that there is insufficient power available to operate both the remote transmitter and the peripheral device and remain within the 18 mW limit.

SUMMARY OF THE INVENTION

The present invention is directed to a local databus that couples one or more peripheral devices through a process control loop interface of a remote industrial process control transmitter that in turn is coupled to a central station. The local databus consumes sufficiently low power so that adequate power is available to operate the remote transmitter and the peripheral device.

According to the present invention, an industrial process control transmitter includes a process control loop interface and a local databus interface coupled between the process control loop interface and a local databus. The local databus includes a signaling wire that has a high signal level during idle communications and is modulated between the high signal level and a low signal level during data communication. The process control loop interface is configured to couple the transmitter to a process control communication loop to transmit and/or receive data over the process control loop. The local databus interface is coupled to the process control loop interface and includes an active current source coupled to the signaling wire to supply power from the process control loop to the local databus. The current source is configured to limit current drawn by the signaling wire during a low signal level. The local databus interface also includes a transmitter and/or a receiver to transmit and/or receive data in the form of signal modulations on the local databus.

DETAILED DESCRIPTION OF THE ILLUSTRATIVE EMBODIMENTS

Figure 1:
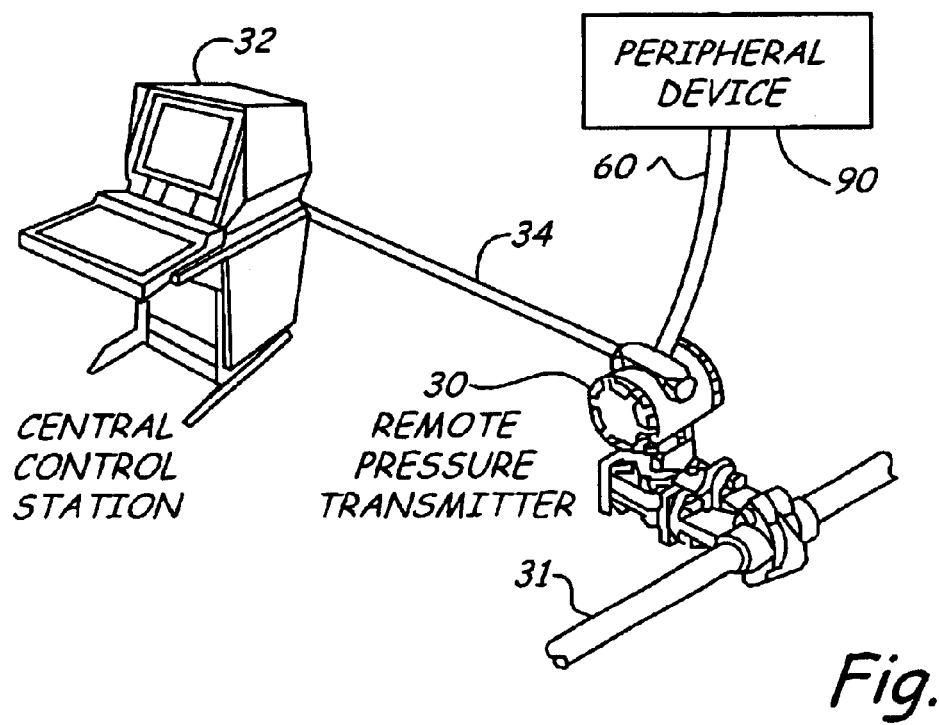
FIG. 1 illustrates a peripheral device coupled to an industrial process control transmitter via a local databus according to the present invention.

FIG. 1 illustrates the environment of the local databus according to the present invention. A remote industrial process control transmitter 30, such as pressure transmitter, is coupled to a process conduit 31 to measure a process variable, such as pressure, in conduit 31. Transmitter 30 is electrically coupled to central control station 32 via a two-wire process control communication loop 34. Transmitter 30 may, for example, be a capacitive pressure transmitter that senses absolute and/or differential pressure in an industrial process. A local databus 60 couples a peripheral device 90 to transmitter 30. Peripheral device 90 may be a liquid crystal display indicator, a remote processor, or another sensor, such as a temperature sensor. In some circumstances, peripheral device might be another remote industrial process control transmitter. Process control communication loop 34 may be a 4–20 milliampere (mA) current loop that powers remote transmitter 30, or a fieldbus connection, a HART protocol communication or an HSH protocol communication connection. Because the remote transmitter is often used in hazardous environments, process control loop 34 is typically a low-power two-wire loop. In the environment of the present invention, power from process control loop 34 is transferred to local databus 60 by a process control loop interface to provide power to peripheral device 90.

Figure 2:
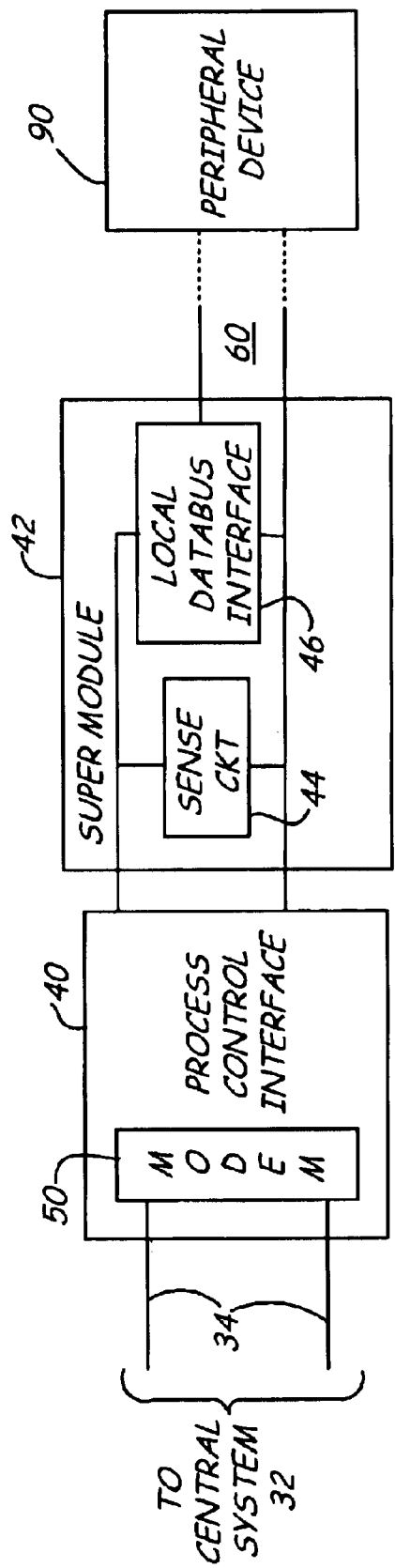
FIG. 2 is a block diagram illustrating a local databus connecting a peripheral device to an industrial process control transmitter in accordance with the present invention.

FIG. 2 is a block diagram of a local databus communications system in accordance with the present invention. An industrial process control transmitter 30, such as a pressure transmitter, includes process control loop interface 40, which in turn includes modem 50 coupled to two-wire process control communication loop 34 to transmit and receive data over the process control loop. Process control transmitter 30 may be embodied in a super module 42 and a feature board that includes process control loop interface 40. Super module 42 includes a sense circuit 44 and a local databus interface 46. Sense circuit 44 includes a pressure sensor, a measurement circuit, a processor and other features associated with the pressure transmitter. Local databus interface 46 couples local databus 60 to process control loop interface 40 to supply power to the local databus. Peripheral device 90, such as a display indicator, sensor, remote processor or another remote transmitter, is coupled to local databus 60. While local database interface 46 is illustrated in FIG. 2 as included in super module 42, in practice it may be preferred to configure the interface entirely on the feature board and couple super module 42 to the feature board via a communication loop, or even local databus 60.

Figure 3:
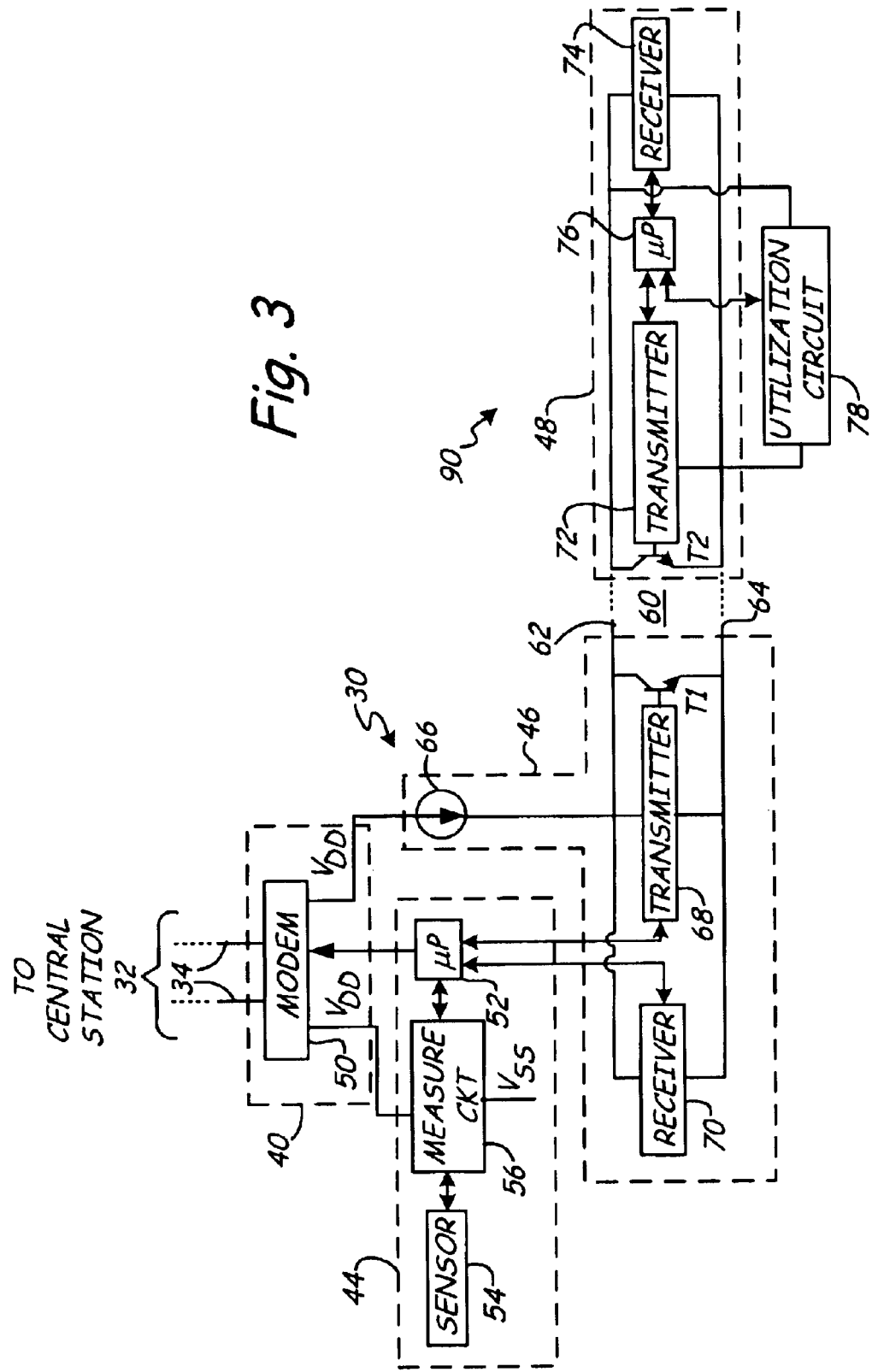
FIG. 3 is a detailed block diagram of one embodiment of the invention illustrated in FIG. 2.

FIG. 3 is a detailed block diagram of one embodiment of the invention illustrated in FIG. 2. Modem 50 is a transmitter/receiver (transceiver) modem that transmits and receives messages in the protocol of the industrial process control system between transmitter 30 and central station 32. Additionally, central station 32 supplies power to transmitter 30 via two-wire process control communication loop 34 through modem 50. Microprocessor 52 is coupled to modem 56 to receive and process messages from central station 32 and to process and send messages to central station 32.

Sense circuit 44 includes sensor 54, measurement circuit 56 and microprocessor 52. Sensor 54 is coupled through measurement circuit 56 to microprocessor 52. Sensor 54 monitors the process variable associated with transmitter 30 and provides signals representative of process values to microprocessor 52. One example of sensor 54 is a capacitive pressure sensor having capacitor plates, at least one of which is movable in response to the monitored condition or process to alter the capacitance value[3] of the sensor. Measurement circuit 56 charges the capacitor plates with power from two-wire process control communication loop 34 and provides digital signals representative of the process variable to microprocessor 54. Of course, the capacitive pressure sensor is merely exemplary of one type of industrial process sensor associated with transmitter 30, and other sensor types, and corresponding measurement circuits, well known in the art, may be employed for sensor 54 and measurement circuit 56.

Modem 50 derives power from communication loop 34. In one example, modem 50 supplies a +6 volt DC voltage level, Vdd, and a common voltage level Vss. Common voltage level Vss may be electrical ground, but that is not a requirement of the circuit. Typically, each remote transmitter 30 coupled to two-wire process control communication loop 34 is designed to draw no more than 18 milliwatts (mW), or 3 mA.

The present invention is directed to a local databus 60 that couples one or more peripheral devices 90 to process control loop interface 40. Thus, local databus 60 couples peripheral devices 90 through local databus interface 46 to central control station 32 via two-wire process control communication loop 34. To meet the requirements of the 4–20 mA communication loop 34, it is preferred that the total current draw of transmitter 30, local databus 60 and peripheral devices 90 be no more than 3 mA.

As shown in FIG. 3, local databus 60 is a two-wire communication link consisting of wires 62 and 64. Current source 66 in transmitter 30 is coupled to the Vdd voltage level from modem 50 to supply current to wire 62. Wire 64 is coupled to the common Vss voltage level. Current source 66 is described in greater detail in U.S. application Ser. No. 09/571,111 filed May 15, 2000 by Brian L. Westfield, Weston Roper and Richard L. Nelson for "Process Control Transmitter Having an Externally Accessible DC Circuit Common" and assigned to the same assignee as the present invention.

In one form of the invention, local databus interface 46 of transmitter 30 includes a local databus transmitter 68 and local databus receiver 70, coupled between wires 62 and 64 and coupled to microprocessor 52 to receive data from and send data to the microprocessor. In this form of the invention, a peripheral databus interface 48 associated with each peripheral device 90 includes local databus transmitter 72, local databus receiver 74 and microprocessor 76, each coupled between wires 62 and 64 of local databus 60. Microprocessor 76 is also coupled to transmitter 72 and receiver 74 to transfer data between microprocessor 76, transmitter 72 and receiver 74. Peripheral device 90 also includes utilization circuit 78, such as a sensor, indicator, processor or remote transmitter. Utilization circuit 78 is coupled to wires 62 and 64 to derive operating power from local databus 60, and to microprocessor 76. In some cases, local databus interface 46 might include only one or the other of transmitter 68 and receiver 70, in which case peripheral interface 48 would include only one or the other of receiver 74 and transmitter 72. For example, if utilization circuit 78 is a display device that receives, but does not transmit information, receiver 70 in interface 46 and transmitter 72 in interface 48 may be omitted. Conversely, if utilization circuit 78 is a temperature sensor that transmits but does not receive information, transmitter 68 in local databus interface 46 and receiver 74 in peripheral databus interface 90 may be eliminated. In other circumstances, such as where utilization device is a remote processor or another remote industrial process control transmitter, local databus interface 46 and the peripheral databus interface 48 includes both a transmitter and a receiver. Thus, FIG. 3 illustrates an embodiment demonstrating a wide range of capabilities of the invention.

Current source 66 is a current-limiting current source, that is, it supplies no more than a pre-established level of current. In the present example, current source 66 is designed to supply a maximum of 0.5 to 1.0 mA of current, depending on the configuration of the system. The pre-established limit may be adjusted to meet the requirements of peripheral device 90, provided that the total current draw of transmitter 30, local databus 60 and peripheral device 90 is no more than system limits. The current limit on local databus 60 prevents inadvertent shutdown of transmitter 30 in the event of a malfunction or short circuit on the local databus or in peripheral device 90. Receivers 70 and 74, microprocessor 76 and utilization circuit 78 are high-impedance devices, that is, they represent a high impedance to local databus 60. Similarly, when not transmitting, transmitters 68 and 72 are also high impedance devices. Consequently, when neither transmitter 68 and 72 is transmitting, all of the devices on local databus 60 are high impedance devices, so that no device coupled to local databus 60 draws significant current. As a result, current source 66 supplies power to wire 62 at or near voltage Vdd (e.g., +6 volts).

Databus transmitters 72 and 68 transmit data by selectively operating respective transistor switches T1 and T2 to conduction to thereby modulate the voltage on wire 62 between high and low signal levels relative to the common voltage on wire 64. Transistor switches T1 or T2 are connected between wires 62 and 64 in an open collector configuration, so that when conducting either transistor pulls the voltage on wire 62 down to near Vss.

In operation of the circuit illustrated in FIG. 3, power is supplied via two-wire process control communication loop 34 to modem 50 to supply voltage levels Vdd and Vss to the circuits of transmitter 30. Current source 66 is connected to modem 50 to supply a voltage at or near Vdd to signaling wire 62 of local databus 60; wire 64 being connected to voltage level Vss. During periods of idle communications when neither transmitter 68 or 72 is transmitting, the voltage on signaling wire 62 remains at or near the high h level, Vdd, and the circuits on local databus 60 draw insignificant or no current. When either transmitter 68 or 72 is transmitting, the transmitting transmitter operates its respective transistor switch T1 or T2 to modulate the voltage on wire 62 between the high voltage level, Vdd, and low voltage level, Vss. The modulation of the voltage level on wire 62 represents data. Consequently, wire 62 is a signaling wire having a high signal level during idle communications and a signal level modulating between high and low levels during data communication.

Digital messages on local databus 60 are received by the respective receiver 70 or 74 for processing by the respective microprocessor 52 or 76. Conveniently, messages on local databus 60 include a unique address of the addressed receiver, so only the one receiver and its associated microprocessor are operated.

Digital messages from central control station 32 are received through modem 50 for microprocessor 52. The digital messages may command various activities, including operating measurement circuit 56 to measure the process condition of the associated sensor 54, or to download data from the associated microprocessor 52.

The central station 32 may interrogate a peripheral device 90 by sending a digital message through modem 50 of transmitter 30 to microprocessor 52. Microprocessor 52 operates measurement circuit 56 to suspend operation of sensor 54, thereby suspending sampling the process condition at sensor 54. In addition, microprocessor 52 operates transmitter 68 to send a coded message onto local databus 60.

The coded message is in the form of a series of modulated voltage drops on wire 62, transmitted in a coded sequence by the operation of transistor switch T1. Each time the voltage on wire 62 is pulled down by transistor T1, current source 66 supplies current to wire 62 to pull the voltage back up to Vdd. If plural peripheral devices 90 are coupled to local databus 60, the coded message includes the unique address of the selected one peripheral device 90. The receivers 74 of all peripheral devices 90 receive the coded message and operate their respective microprocessors 76 to prevent their associated transmitters 72 from transmitting onto local databus 60. The receiver 74 that decodes its own address additionally decodes the coded message and provides the message to its associated microprocessor 76. That microprocessor 76 performs or directs the function directed by the coded message, and then to operate the associated transmitter to transmit data onto local databus 60 to local receiver 70 in transmitter 30, or such other function commanded by the coded message.

All of the receivers 70 and 74 are responsive to voltage drops on line 62 to operate their respective microprocessors 52 and 76. Unless that microprocessor already commanded the respective databus transmitter 68 or 72 to transmit coded messages, the microprocessor responds to the receiver to prevent transmission by the associated local databus transmitters 68 and 72. Hence, the local databus transmitters are prevented from simultaneously transmitting messages. Thus, microprocessors 52 and 76 serve to arbitrate use of local databus 60 and resolve contention between transmitter 30 and devices 90.

Local databus transmitter 72 and receiver 70 operate in a manner similar to a Controller Area Network (CAN) transceiver. Similarly, local databus transmitter 68 and receiver 74 also operate in a manner similar to a CAN transceiver. It is preferred that local databus 60 employs a modified CAN protocol as described in U.S. application Ser. No. 09/520, 292 filed Mar. 7, 2000 by Dale S. Davis for "Component Type Adaption in a Transducer Assembly" and assigned to the same assignee as the present invention. Each databus transceiver consists of a local databus transmitter 68 or 72 and receiver 70 or 74. Each transceiver operates under the control of an associated microprocessor 52 or 76 which is responsive to the associated receiver 70 or 74 receiving coded messages to inhibit the associated transmitter 68 or 72 from transmitting. However, transmission is not inhibited where a microprocessor 52 or 76 is operating a transmitter 68 or 72 to transmit coded messages onto the local databus. In that case, the microprocessor associated with the transmitting databus transmitter ignores the receipt of coded signals by the associated receiver.

One feature of the invention resides in the operation of local databus 60 by current source 66. Traditional CAN networks operated databuses with a passive bias element, such as a bias resistor. Cable capacitance of the databus limited the overall bandwidth of the databus. Moreover, the passive bias elements created slew in the data signals in the form of signal ramps at data pulse transitions, the ramps having a slope based on the RC time constant of the cable capacitance and bias resistor. Traditional CAN networks employed small bias resistances to minimize the effects on bandwidth and slew. However, small bias resistances required the CAN network to itself consume a considerable amount of power. It would be impractical to employ such a CAN network in industrial process control systems because the CAN network would consume so much power that insufficient power would be available for the industrial process control transmitter 30 or the peripheral device coupled to the CAN network. One solution might seemingly be to simply employ a large passive bias resistance in the CAN network, thereby reducing the power requirements of the CAN network. However, increasing the bias resistance to accommodate the low power requirements of the industrial process, control system would dramatically increase the RC time constant of the databus, adversely impacting bandwidth and slew.

In the present invention, current source 66 charges the cable capacitance more quickly than passive bias resistors, thereby increasing the bandwidth of the databus and minimizing slew. Moreover, the current source permits the peripheral devices 90 to receive power directly from the databus. Hence current source 66 provides a low power source for peripheral devices 90 coupled to the databus. Microprocessor 52, when directing communications with one of peripheral devices 90 via local databus 60, operates portions of transmitter 30 to minimal power draw, thereby assuring adequate power for peripheral device 90. Current source 66 limits the current to peripheral devices 90 to remain within the limits of the 3 mA current limit for the total of transmitter 30 and peripheral device(s) 90.

Utilization circuit 78 may be any suitable circuit useful with transmitter 30. For example, circuit 78 may be a microprocessor to perform computations on data from measurement circuit 56 in transmitter 30 before sending data to central station 32. In such a case, the microprocessor of circuit 78 would perform computations on data from transmitter 30 not performed by microprocessor 52 in the transmitter, and would transmit those computations to the central station via local databus 60 and receiver 70, and via modem 50 and communication loop 34, as described. Where circuit 78 is a microprocessor, it may be part of, or separate from microprocessor 76, which serves primarily to arbitrate local databus usage.

Another example of utilization circuit 78 is as a remote liquid crystal display (LCD). In such a case, peripheral device 90 might be placed in a remote monitor station, or even in central control station 32, to provide constant monitoring of the process variable monitored by sensor 54 of transmitter 30. This use of the local databus 60 takes advantage of the operation of the local databus independently of the data transfer capacities of two-wire process control communication loop 34. Hence, the local databus may be operated at a higher speed than process control loop 34, resulting in nearly instantaneous monitoring of the condition sensed by sensor 54.

Utilization circuit(s) 78 might also be another industrial process control transmitter. Time division multiplexing techniques would permit use of local databus 60 by the several transmitters.

The present invention thus provides a low power local databus connection between an industrial process control transmitter and peripheral devices so that power from the central control station is delivered to the peripheral devices within the power budget of the remote transmitter 30.

Although the present invention has been described with reference to preferred embodiments, workers skilled in the art will recognize that changes may be made in form and detail without departing from the spirit and scope of the invention.

What is claimed is:

1. A transmitter for measuring a process variable of a process, comprising:
    a process control loop interface configured to couple to a process control loop and transmit data over the process control loop; and
    a local databus interface coupled between the process control loop interface and a local databus having a signaling wire and a common wire, wherein the common wire has a first signal level and the signaling wire has a second signal level during periods of idle communication and is modulated between first and second signal levels during periods of data communication, the local databus interface including
        an active current source coupled to the signaling wire configured to limit current drawn by the signaling wire during a first signal level.

2. The transmitter of claim 1, wherein the local databus interface includes a local databus transmitter having a switch coupled between the signaling wire and the common wire, the switch being operable between a high impedance to maintain the signal level on the signaling wire high and a low impedance to pull the signal level on the signaling wire low.

3. The transmitter of claim 2, including a microprocessor and wherein the local databus interface includes a local databus receiver coupled between the signaling wire and the common wire, the receiver being responsive to changes of the signal level on the signaling wire between high and low to supply data to the microprocessor representative of the changes of the signal level.

4. The transmitter of claim 1, including a microprocessor and wherein the local databus interface includes a local databus receiver coupled between the signaling wire and the common wire, the receiver being responsive to changes of the signal level on the signaling wire between high and low to supply data to the microprocessor representative of the changes of the signal level.

5. The transmitter of claim 1, wherein the local databus is in accordance with the CAN standard.

6. The transmitter of claim 1, wherein the process control loop interface is configured to wholly power the transmitter.

7. The transmitter of claim 6, wherein the local databus interface is configured to wholly power circuitry coupled to the local databus with power received from the process control loop.

8. An industrial process control system comprising:
    a central process control station for transmitting data and power and for receiving data;
    a process control loop coupled to the central process control station to transmit power from the central process control station and to communicate data with the central process control station;
    at least one remote transmitter for measuring a process variable of a process;
    a process control loop interface coupled between the process control loop and the at least one remote transmitter to transmit data onto the process control loop and to receive data and power from the process control loop;
    a local databus having a common wire and a signaling wire;
    at least one peripheral device having a peripheral databus interface coupled to the local databus;
    a local databus interface coupled between the process control loop interface and the local databus, the local databus interface including:
        an active current source configured to apply a high signal level to the signaling wire and a low signal level to the common wire;
        at least one of the local and peripheral databus interfaces being operable to modulate the signal level on the signaling wire between the high and low levels to thereby transmit data onto the local databus, and at least the other of the peripheral and local databus interfaces being responsive to the modulated signal level on the signaling wire to thereby receive data from the local databus, the active current source being configured to limit current drawn by the signaling wire during a low signal level on the signaling wire.

9. The industrial process control system of claim 8, wherein the one of the peripheral and local databus interfaces that is operable to modulate the signal level on the signaling wire includes a local databus transmitter having a switch coupled between the signaling wire and the common wire, the switch being operable between a high impedance to maintain the signal level on the signaling wire high and a low impedance to pull the signal level on the signaling wire low.

10. The industrial process control system of claim 8, wherein the one of the peripheral and local databus interfaces that is responsive to the modulated signal level on the signaling wire includes a local databus receiver coupled between the signaling wire and the common wire responsive to the modulated signal level on the signaling wire.

11. The industrial process control system of claim 10, including a microprocessor coupled to the local databus receiver, the receiver being responsive to changes of the signal level on the signaling wire between high and low to supply data to the microprocessor representative of the changes of the signal level.

12. The industrial process control system of claim 8, wherein the peripheral and local databus interfaces each includes:
    a local databus transmitter having a switch coupled between the signaling wire and the common wire, the switch being operable between a high impedance to maintain the signal level on the signaling wire high and a low impedance to pull the signal level on the signaling wire low, and
    a local databus receiver coupled between the signaling wire and the common wire responsive to the modulated signal level on the signaling wire.

13. The industrial process control system of claim 12, the peripheral and local databus interfaces each further includes a microprocessor coupled to the respective local databus receiver, each receiver being responsive to changes of the signal level on the signaling wire between high and low to supply data to the microprocessor representative of the changes of the signal level.

14. The industrial process control system of claim 13, wherein each microprocessor is coupled to the respective local databus transmitter to inhibit the respective receiver from being responsive to change of the signal level on the signaling wire.

15. The industrial process control system of claim 8, wherein the local databus is in accordance with the CAN standard.

16. The industrial process control system of claim 8, wherein the process control loop interface is configured to wholly power the remote transmitter from the process control loop.

17. The industrial process control system of claim 8, wherein the local databus interface is configured to wholly power the at least one peripheral device from the process control loop.

* * * * *

UNITED STATES PATENT AND TRADEMARK OFFICE
CERTIFICATE OF CORRECTION

PATENT NO. : 6,765,968 B1
DATED : July 20, 2004
INVENTOR(S) : Richard L. Nelson et al.

It is certified that error appears in the above-identified patent and that said Letters Patent is hereby corrected as shown below:

Title page,
Item [56], References Cited, U.S. PATENT DOCUMENTS, "4,124,027" reference, delete "Boss" and insert -- Clark --.
OTHER PUBLICATIONS, "Product Data Sheet No: 00813-0100-4360" reference, delete "Alpaline®" and insert -- Alphaline® --.

Signed and Sealed this

Thirteenth Day of September, 2005

JON W. DUDAS
*Director of the United States Patent and Trademark Office*